(12) United States Patent
Jenkins (10) Patent No.: US 7,527,113 B2
(45) Date of Patent: May 5, 2009

(54) HUB DRIVE SYSTEM

(75) Inventor: Marcus Jenkins, Sheffield (GB)

(73) Assignee: Magnetic Systems Technology Limited, Sheffield (GB)

( * ) Notice: Subject to any disclaimer, the term of this patent is extended or adjusted under 35 U.S.C. 154(b) by 651 days.

(21) Appl. No.: 10/518,881

(22) PCT Filed: Jun. 18, 2003

(86) PCT No.: PCT/GB03/02619

§ 371 (c)(1),
(2), (4) Date: Dec. 20, 2004

(87) PCT Pub. No.: WO03/106207

PCT Pub. Date: Dec. 24, 2003

(65) Prior Publication Data
US 2005/0236198 A1    Oct. 27, 2005

(30) Foreign Application Priority Data
Jun. 18, 2002    (GB) ................. 0213944.2

(51) Int. Cl.
*B60K 1/00*    (2006.01)
(52) U.S. Cl. .................. 180/65.5; 180/65.1; 180/65.6; 180/55; 180/308
(58) Field of Classification Search .......... 180/65.1, 180/65.5, 65.6, 55, 308; 310/67 R
See application file for complete search history.

(56) References Cited

U.S. PATENT DOCUMENTS

| 2,258,328 | A | * | 10/1941 | Lee et al. ................. 180/253 |
| 3,035,652 | A |   | 5/1962  | McLean |
| 3,770,074 | A |   | 11/1973 | Sherman |
| 3,812,928 | A | * | 5/1974  | Rockwell et al. .......... 180/65.5 |
| 3,897,843 | A | * | 8/1975  | Hapeman et al. .......... 180/65.5 |
| 4,330,045 | A |   | 5/1982  | Myers |
| 4,389,586 | A |   | 6/1983  | Foster et al. |
| 4,799,564 | A |   | 1/1989  | Iijima et al. |

(Continued)

FOREIGN PATENT DOCUMENTS

EP          0410723          1/1991

(Continued)

OTHER PUBLICATIONS

Search Report of British Application No. 0213944.2 dated Sep. 13, 2002.

(Continued)

*Primary Examiner*—Christopher P Ellis
*Assistant Examiner*—Jacob Meyer
(74) *Attorney, Agent, or Firm*—Alston & Bird LLP (57) ABSTRACT

A hub drive has a tubular housing suspended in a vehicle, and a motor in one, inboard end of the housing, and a gearbox in the other end. A hub is driven by the gearbox and is journalled on the housing. A gallery is defined between the motor and housing to receive lubricant from an external connector to cool the motor before delivery via a passage to a rotor of the motor, and thence to the gearbox to lubricate the gearbox. The drive is dismantleable without removal of the vehicle wheel, from the open ends of the housing. A gear change mechanism permits minimisation of the motor while still providing a wide range of torque and speed capability.

53 Claims, 4 Drawing Sheets

U.S. PATENT DOCUMENTS

| | | | |
|---|---|---|---|
| 5,014,800 A | | 5/1991 | Kawamoto et al. |
| 5,156,579 A | | 10/1992 | Wakuta et al. |
| 5,163,528 A | | 11/1992 | Kawamoto et al. |
| 5,221,381 A | * | 6/1993 | Hurrell, II ................... 152/416 |
| 5,322,141 A | | 6/1994 | Brunner et al. |
| 5,372,213 A | | 12/1994 | Hasebe et al. |
| 5,382,854 A | | 1/1995 | Kawamoto et al. |
| 5,397,281 A | * | 3/1995 | Forster ........................ 475/83 |
| 5,472,059 A | | 12/1995 | Schlosser et al. |
| 5,691,584 A | * | 11/1997 | Toida et al. ............... 310/67 R |
| 5,813,488 A | | 9/1998 | Weiss |
| 5,906,249 A | * | 5/1999 | Monkkonen ................ 180/292 |
| 6,113,119 A | * | 9/2000 | Laurent et al. ........... 280/124.1 |
| 6,328,123 B1 | * | 12/2001 | Niemann et al. ........... 180/65.5 |
| 6,358,176 B1 | | 3/2002 | Nauheimer et al. |
| 6,561,017 B1 | * | 5/2003 | Claussen et al. .............. 73/146 |
| 6,651,762 B1 | * | 11/2003 | Hokanson et al. .......... 180/65.5 |

FOREIGN PATENT DOCUMENTS

| | | |
|---|---|---|
| JP | 62175217 | 7/1987 |
| JP | 62221918 | 9/1987 |

OTHER PUBLICATIONS

International Search Report for PCT/GB03/02619 Completed Nov. 6, 2003.

* cited by examiner

HUB DRIVE SYSTEM

BACKGROUND OF THE INVENTION

1) Field of the Invention

The present invention relates to hub drives for vehicles, in particular a steerable land vehicle.

2) Description of Related Art

Hub drives are known in hybrid vehicles comprising four or more driven wheels each provided with an independent electric motor driving a gearbox mounted in the hub of the wheel. Power for the motors is usually provided by a battery, which is itself normally charged by a combustion engine mounted in the vehicle. Such an arrangement is efficient for vehicles operating in various conditions such as public transport. They are also effective for certain military vehicles for providing stealth operation occasionally when the combustion engine is temporarily stopped.

The requirements for hub drives are multifarious. They should be light since they are mounted on unsuspended parts of the vehicle, yet they need to meet respectable power expectations. Indeed, such expectations are not just in respect of peak torques that the motor and associated gearbox deliver (perhaps in the region of 20,000 Nm, with continuous torque at about half this), but also in respect of the instantaneous torques they may experience in the field. Such torques may be generated, for example, through forced acceleration due to the vehicle dropping onto a wheel from a height. Such torques that the drive might be expected to handle in some vehicles are in the region of 70,000 Nm.

Hub drives also need to be accessible, so that they can be serviced easily when faults develop. They require effective braking systems. Braking torque requirements are invariably much higher than required drive torques.

Frequently, it is desirable to employ the motor, at least partially in this respect, to assist braking and feedback power to the battery charging circuit. An efficient control system is also required to synchronise drive to each wheel to ensure efficient operation, and this may include anti-slip and anti-lock functions, yaw control and vehicle steering.

Hub drives should be reliable, particularly in military vehicles. Active control of tyre pressures is also desirable in such vehicles, and facilities for this impact the design of hub drives.

WO-A-9723363 discloses a drive having a motor in a casing forming a frame suspended in the vehicle. The motor drives a shaft forming a sun wheel for a planetary gearbox, whose planet gears drive a hub rotationally mounted on an extension of the frame around the shaft. A clutch selectively locks a planet wheel to the frame to transmit drive.

U.S. Pat. No. 5,163,528 and U.S. Pat. No. 5,014,800 both disclose a wheel motor having a stator fixed to a casing and a rotatable rotor and an integrated reduction gear.

U.S. Pat. No. 4,389,586 discloses a wheel drive having an inboard mounting frame tube incorporating planetary gears and an motor removal from an outboard side, the wheel being mounted on large diameter bearings on the frame tube.

U.S. Pat. No. 5,472,059 discloses a frame on the inboard side of which is mounted a motor whose drive shaft extends through the frame and on a neck of which frame is mounted a wheel hub. A planetary gearbox is on the outboard end of the frame and shaft and drives the hub.

U.S. Pat. No. 5,382,854 discloses a wheel drive in which a stator is fixed in a frame element, and a rotor drives the sun wheel of a planetary reduction gear disposed within the confines of the rotor and arranged to drive a hub rotationally mounted in the frame. The frame forms a sealed casing receiving oil which is circulated to both cool the motor and lubricate the planetary gear system.

In none of the aforementioned arrangements is substantial dismantling of the drive possible without removing the wheels of the vehicle.

BRIEF SUMMARY OF THE INVENTION

In accordance with a first aspect of the present invention, a hub drive system for a vehicle, comprising:

a) a tubular housing suspended by the vehicle and having an inboard and an outboard end;

b) a wheel hub rotationally mounted on the outboard end of the housing;

c) an electric motor disposed in the inboard end of housing;

d) a planetary gearbox, disposed in the outboard end of the housing and driven by the motor through a hollow primary shaft;

e) an output flange of the gearbox operatively connected to the hub, f) a casing for the motor;

g) a stator in the casing;

h) a hollow rotor rotationally mounted in the casing and operatively connected to the primary shaft of the gearbox;

i) a gallery defined between the housing and casing and into which a lubricant for the gearbox is injectable to cool the motor;

j) a passage in the casing to deliver lubricant from said gallery to said hollow rotor to further cool the motor; and k) said rotor being arranged to deliver said oil to the primary shaft to lubricate the gearbox.

The motor casing preferably has a substantially cylindrical outboard end sealed and centred in the housing by an O-ring.

The casing preferably is a sliding fit in the housing to permit inboard access to the motor without any need for a wheel removal.

In another aspect, the invention provides a hub drive system for a vehicle, comprising:

a) a tubular housing suspended by the vehicle and having inboard and outboard open ends;

b) a wheel hub rotationally mounted through hub bearings on the outboard end of the housing;

c) an electric motor disposed in the inboard end of the housing;

d) a planetary gearbox, disposed in the outboard end of the housing within the radial confines of said bearings and driven by the motor through a primary shaft;

e) an output flange of the gearbox detachably connected to the hub and closing the outboard end of the housing; wherein f) without removing the wheel, the motor is removable inboard of the housing and the gearbox is dismantleable primarily outboard of the housing.

The motor preferably drives a primary shaft of the gearbox, which shaft is rotationally supported in the hub. The other, inboard end of the primary shaft is journalled in the motor. The motor preferably has a casing in which is fixed a stator and in which is rotationally journalled a rotor. In which event, the primary shaft is preferably journalled in the motor through the rotor.

The gearbox preferably comprises two stages of gear reduction and a gear change mechanism.

The gear change mechanism preferably comprises a shift gear ring for a first planet gear carrier rotationally mounted on the primary shaft and driving the hub, which shift gear ring is lockable to one of the primary shaft and the housing by a shift mechanism.

The planet gear carrier may drive the hub through one or two fixed ratio gear sets.

The shift mechanism may comprise a shift element slidable between two positions, in a first position locking the shift gear ring to a housing gear ring, and in a second position locking the shift gear ring to a primary shaft gear ring.

The shift element may include a ferromagnetic disc axially shiftable by solenoids mounted in the housing.

Alternatively, the shift element may comprise a magnetic sleeve shiftable by an induction coil mounted in the housing.

The gear change mechanism may further include active speed control of the motor during gear change to adjust dynamically the motor speed to the requisite speed commensurate with the desired gear ratio and when said shift element is in a neutral position intermediate said first and second positions and in which neither said housing gear ring nor said primary shaft gear ring is locked to the shift gear ring, said active speed control comprising a motor speed sensor, a hub speed sensor and a control arrangement to accelerate or decelerate the motor in dependence upon which gear is selected. The control arrangement may be in software.

A brake disc is preferably mounted on the hub and brake callipers mounted on the housing.

In another aspect, the present invention provides a hub drive system for a vehicle, comprising:

a) a tubular housing suspended by the vehicle and having inboard and outboard open ends;

b) a wheel hub rotationally mounted through hub bearings on the outboard end of the housing;

c) an electric motor disposed in the inboard end of the housing and comprising a stator fixed with respect the housing and a rotor journalled for rotation in the housing;

d) a planetary gearbox, disposed in the outboard end of the housing and driven by the motor through a primary shaft coaxial with the rotor;

e) an output flange of the gearbox detachably connected to the hub and closing the outboard end of the housing; and f) a gear change mechanism between the rotor and a first stage gear reduction of the gearbox to provide three options:
  i) to interpose a further gear reduction stage ahead of said first stage reduction;
  ii) to disconnect drive of the motor from the gearbox; and
  iii) to isolate said further gear reduction stage and connect drive from the motor direct to said first stage.

Preferably, said shift element has a third, neutral position in which the shift ring is locked to neither the primary shaft ring nor the housing ring. Said neutral position may be between said first and second positions, said shift element moving coaxially with respect to said primary shaft.

Said shift element may be a ring surrounding said primary shaft, it may be provided with ferromagnetic elements and it may be disposed within the confines of a gear shift coil fixed in the housing and adapted to move the shift element by magnetic interaction.

Preferably, said first stage gear reduction comprises a first sun gear, driven by the motor, planets, carried by a first planet carrier and driving said output flange, and a first planet ring fixed in the housing. Said first sun ring may be formed on said intermediate planet carrier.

The gearbox preferably has a second stage reduction after said first stage and directly driving said output flange. In which case, said second stage may comprise a second sun gear, driven by the first stage gear reduction, planets, carried by said output flange, and a second planet ring fixed in the housing, the second sun ring preferably being formed on said first planet carrier.

An air tube is preferably disposed in the rotor and primary shaft to deliver air from a port in the casing to a port in the hub for controlling tyre pressure of a wheel mounted on the hub.

The air tube may be arranged to increase the rotor contact surface area per unit volume of lubricant flowing past the rotor at any given instant. Moreover, said air tube is preferably fixed in the output flange, passages therein communicating with a port on the output flange to permit connection of a conduit to a tyre valve of a wheel mounted on the hub. In this event, it may be rotationally mounted in an inboard end plate of the motor, passages therein communicating with a port on the end plate to permit connection of a conduit from a source of air under sufficient pressure to control inflation of the tyre, a rotary seal being disposed between said air tube and end plate.

Said seal may be arranged to separate said passages in the endplate that communicate the air tube with said port on the end plate from said passage in the casing that delivers lubricant from said gallery to said hollow rotor.

The invention provides also a hub drive system that incorporates a combination of the aforementioned aspects of the present invention.

BRIEF DESCRIPTION OF THE SEVERAL VIEWS OF THE DRAWINGS

The invention is further described hereinafter, by way of example, with reference to the accompanying drawings, in which.

DETAILED DESCRIPTION OF THE INVENTION

In the drawings, a hub drive 10 comprises a housing 12 mounted in a vehicle through suspension joints 14, 16 fixed to the housing 12. The housing 12 is essentially tubular having an inboard open end 18 and an outboard open end 20.

In the inboard end 18 is disposed a motor 22 comprising a casing 24 in three parts. The casing 24 comprises an inboard end plate 24a, an essentially cylindrical part 24b and an outboard end plate 24c. Inside the casing 24 is fixed a stator 26. Rotationally journalled between the end plates 24a,c is a rotor 28. The rotor is journalled in bearings 30a,b and is provided with a through-bore 32.

Figure 4:
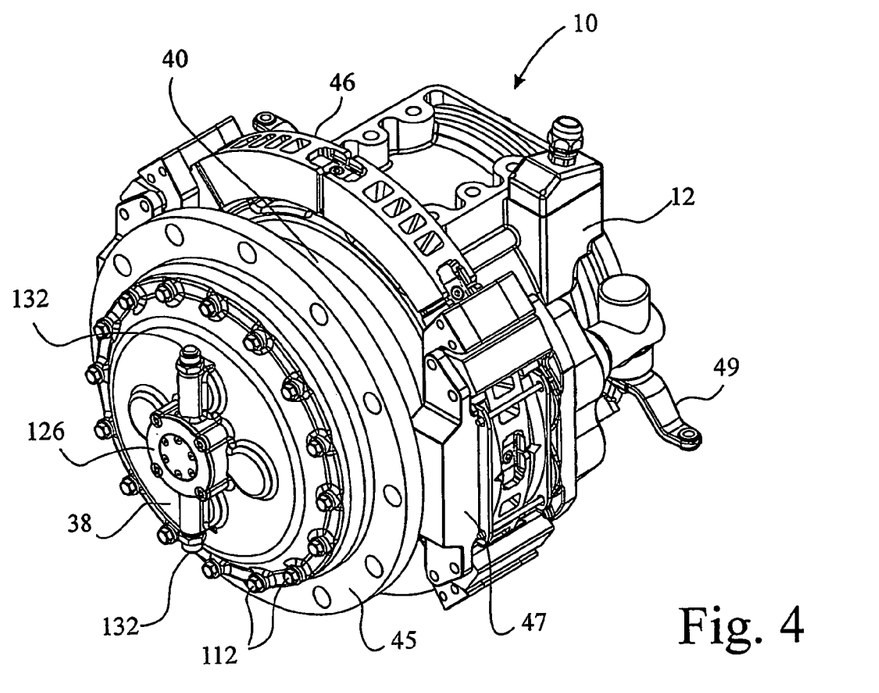
FIG. 4 is a perspective view of the drive of FIG. 1 from its outboard end.
Figure 5:
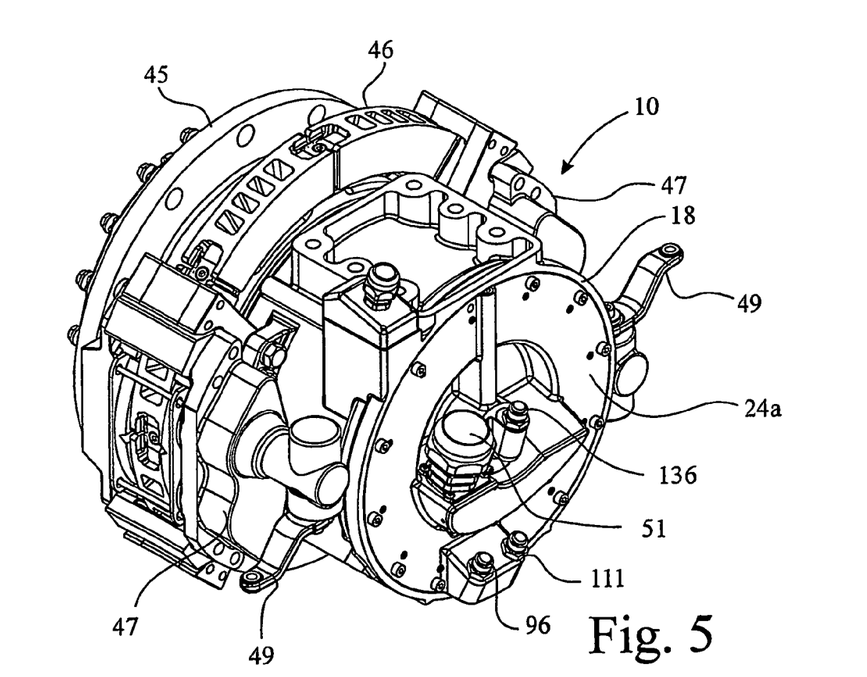
FIG. 5 is a perspective view of the drive of FIG. 1 from its inboard end.

The rotor 28 drives a primary gear shaft 34 of a gearbox 36 disposed in the outboard end 20 of the housing 12. The gearbox 36 is described further below, but terminates in a drive or output flange 38 which is connected to a hub 40 journalled on the housing 12 through bearings 42a,b. The hub 40 carries a wheel rim 44 through a hub flange 45. Also formed on the hub 40 is a brake disc 46, brake callipers 47 (see FIGS. 4 and 5) being mounted on the housing 12. The brake callipers have linkages 49 for the connection of steering or tracking arms (not shown).

Figure 2:
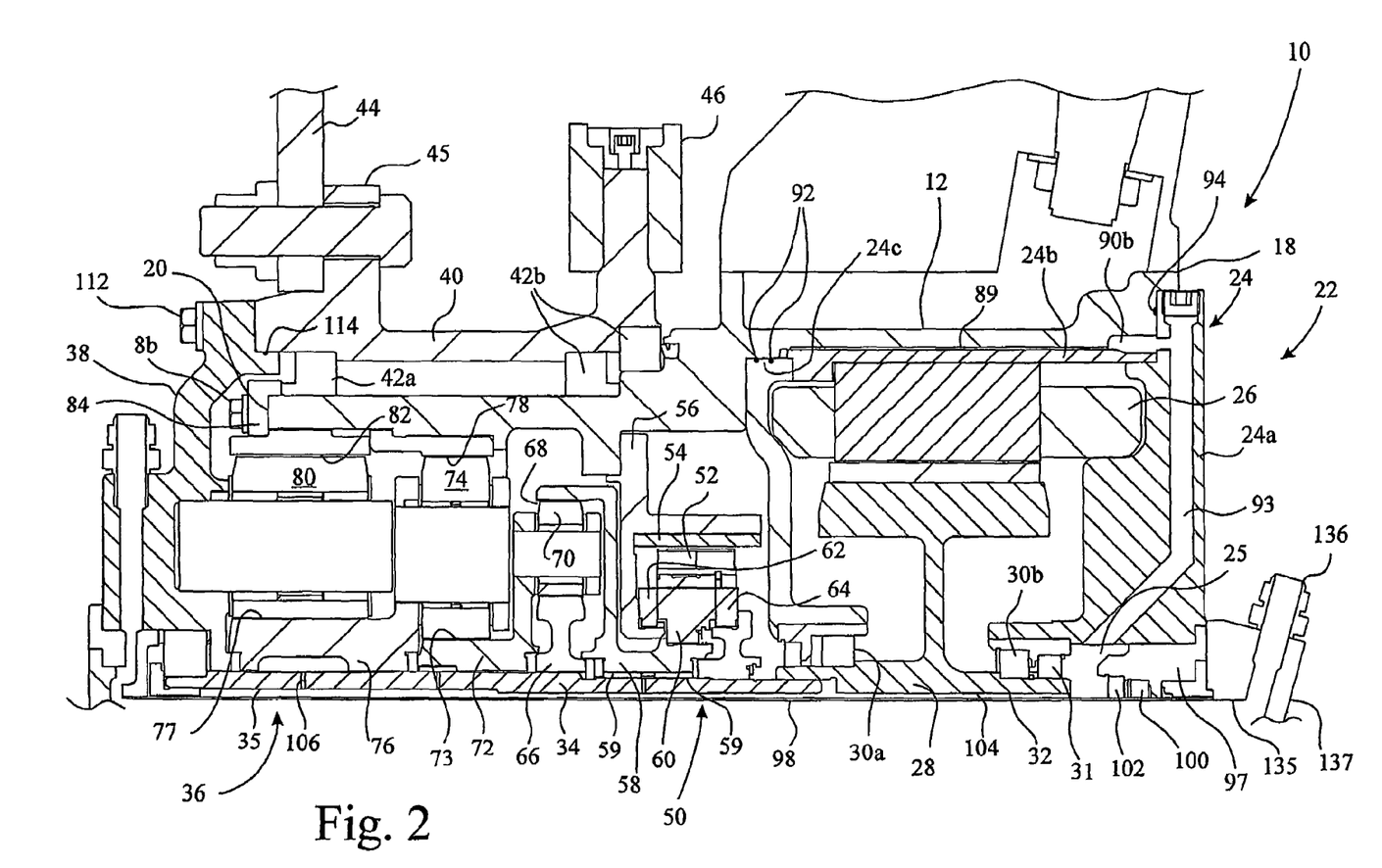
FIG. 2 is an enlarged view of the top half of the drive in FIG. 1.

Turning to FIG. 2, the rotor 28 is a permanent magnet rotor driven by a rotating magnetic fields caused by fluctuating currents in the stator coils 26 under the control of a control system (not shown). Electrical leads (not shown) supplying power and control signals to the motor, as well as sensor signals from the motor and gearbox, pass through a connector 51. The rotor 28 is splined to the end of the primary shaft 34 so that it rotates at the same speed as the rotor 28. A shift mechanism 50 comprises a shift element 52 which is axially slidable with respect to the primary shaft 34 by a solenoid coil 54 mounted in a housing flange 56 forming part of the housing 12. The shift element 52 has three positions, it being shown in a neutral position in the drawings. In a first position, a planet gear ring 58, provided with a gear ring 60, is free with respect to a housing gear ring 62, fixed on the flange 56 and with respect to a primary shaft gear ring 64, fixed on the primary shaft 34. The planet ring 58 is journalled for rotation on the shaft 34 through bearing sleeves 59.

When a low gear ratio is selected, the coil 54 urges the shift element 52 rightwardly in the drawings so as to lock gear rings 60 and 64 together. Rotation of the primary shaft 34 caused by rotation of the rotor 28, is then transmitted directly to first planet ring 58 which accordingly rotates at the speed of rotation of the primary shaft 34. On the primary shaft 34 is locked a sun ring 66. Between that and an internal gear 68 on the planet gear ring 58 are a plurality of planet gears 70 carried by a first planet carrier 72. In this low ratio gear, sun ring 66 and 68 rotate at the same speed as the primary shaft 34 and consequently communicate drive directly to the planet carrier 72 which therefore also rotates at the same speed as the primary shaft 34.

Carrier 72 has sun gear 73 that drives planets 74 mounted on second planet carrier 76. Planets 74 rotates inside first housing planet ring 78 so that second carrier 76 is driven to rotate but at a reduced speed compared with primary shaft 34.

Second carrier 76 itself has a second gear sun gear 77 that drives planets 80 of a third stage reduction and which rotate in a second housing planet ring 82. Planet rings 78, 82 are fixed in the housing 12 by flange 84 and securing bolts 86. That flange also locates bearings 42$a,b$ and hub 40 on the housing 12.

Planets 80 are mounted on drive flange 38 which rotates at a further reduced speed compared with second planet carrier 76. In this low ratio gear position, therefore, there are two stages of gear reductions provided by stages 73,74,76,78 and 77,80,82,38.

When the shift element 52 is shifted leftwardly in the drawings, however, the high ratio gear is selected in which housing ring 62 is locked to the gear ring 60 of the planet ring 58. Accordingly, planet ring 58 becomes locked with respect to the housing 12. Drive from shaft 34 then passes through sun gear 66 to first planet carrier 72 at reduced speed via planets 70 rotating in planet ring gear 68. Thereafter, the drive is as obviously previously described. But in this high ratio gear there is a third stage 66,70,68,72 of speed reduction.

Figure 3:
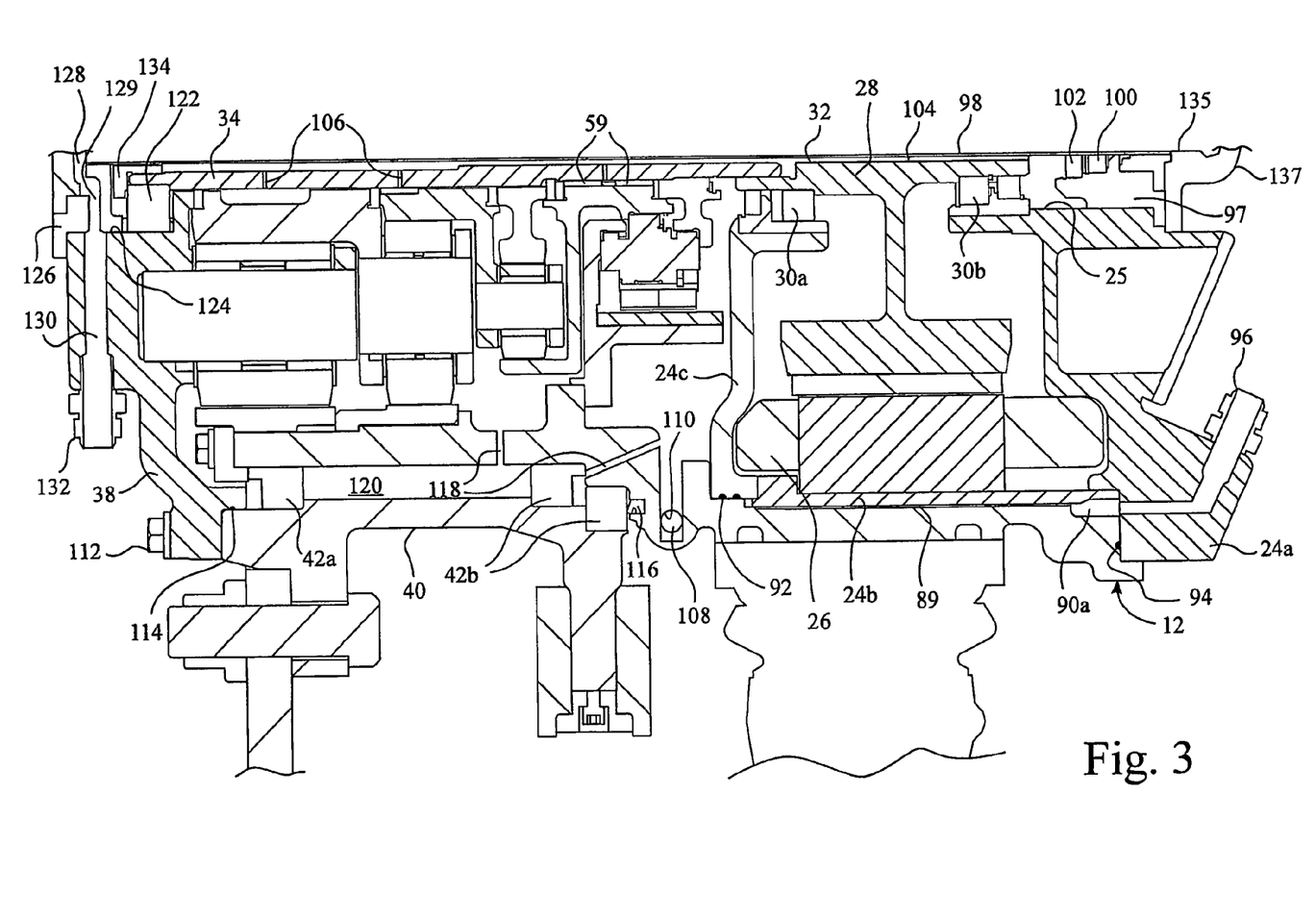
FIG. 3 is an enlarged view of the bottom half of the drive in FIG. 1.

In accordance with the first aspect of the present invention, an annular gallery 89 is defined between casing 24 and housing 12 between O-rings 92 and 94. Referring to FIG. 3, an oil inlet port 96 permits connection of a high pressure oil supply (not shown) to the housing 12 to pump oil under pressure into the gallery inlet manifold 90$a$. The oil flows around casing cylindrical part 24$b$ cooling the stator coils 26 in the process and evolving into gallery outlet manifold 90$b$. Here, a passage 93 is formed in the end plate 24$a$ delivering the oil to a central bore 25 of the end plate 24$a$. The rotor 28 is journalled on one of its ends in the bore 25 through bearing 30$b$. A rotary seal 31 closes the inboard end of the bore 25. The outboard end of the bore 25 is plugged by an air tube 97 rotationally supporting one end of an air tube 98 through a bearing 100. A seal 102 seals the air tube 98 with respect to the bore 25. The function of air tube 98 is described further below.

Therefore, oil in the bore 25 from the passage 93 has only one route out, which is through annular passage 104 defined between the bore 32 of the rotor 28 and the outside of air tube 98. In passing along this passage, the rotor 28 is cooled by the oil flow. Given the narrow dimension of the annular passage 104, and, indeed, the annular gallery 98 effective transfer of heat from the rotor and stator to the oil can be achieved. This is due to the large ratio of surface area of the parts to be cooled to the volume of oil flowing over those parts. The rate of flow of oil is, of course, dependent upon the pressure of the oil.

After cooling the motor 22, the oil flows into the confines of gear box primary shaft 34, which, like the rotor 28, has a through bore 35. Periodically along the shaft 34, passages 106 through the shaft 34 permit oil to jet into the interior of the gearbox 36. By this mechanism, the various gears in the gearbox are lubricated. Finally, the oil collects in a sump 108 where a passage 110 returns the oil to an outlet port 111 (see FIG. 5) for re-circulation to the pump (not shown).

Drive flange 38 is bolted to hub 40 by a plurality of bolts 112 and sealed thereto by an O-ring 114. Hub 40 is sealed to the housing 12 by lip seal 116. This permits further passages 118 through the side of housing 12 to transport oil to the space 120 between the hub 40 and housing 12 and lubricate the bearings 42$a,b$. In combination with the hub 40, the drive flange 38 therefore serves as a closure cap for the open end 20 of the housing 12.

Primary shaft 34 rotates at a different speed to the end flange 38 and is mounted therein on bearings 122. Thus, with respect to the housing 12, primary shaft 34 is mounted at its outboard end through bearing 122, and bearings 42$a,b$, and its other end through the rotor 28 and its bearings 30$a,b$ and the location of end plates 24$a,c$ in the housing 12. Bearings 122 are mounted in a central bore 124 of the drive flange 38. The bore is closed by a plug 126 in which is fixed air tube 98. The plug 126 has a central chamber 128 in communication with the bore of the air tube 98. The plug 126 also has passages 129, communicating the chamber 128 with passages 130 in the drive flange 38 that terminate in connectors 132. These connect conduits (not shown) to the inlet valves of tyres mounted on the wheel rim 44.

The air tube 98 passes through a nut 134 that locates the primary shaft 34 with respect to the bearing 122. The tube 98 continues along the bore of the primary shaft 34, through the bore 32 of the rotor 28, and past seal 102. The air tube is mounted in bearing 100 in plug 97 and communicates, along passages 135 formed in the plug 97 and boss 137 fixed to the end plate 24$a$, with conduit connector 136. A conduit (not shown) is connectable to connector 136 to provide air under pressure to control inflation of the tyre on the wheel rim 44. Thus, the seal 102 not only closes the outboard end of bore 25 and prevents the escape of oil therefrom, but also it seals air tube 98 and prevents air under pressure therein from escaping into the motor and gearbox. Indeed, given the respective oil and air pressures on either side of the seal 102, that seal does not have to be so effective that it wears rapidly against the air tube 98.

Figure 1:
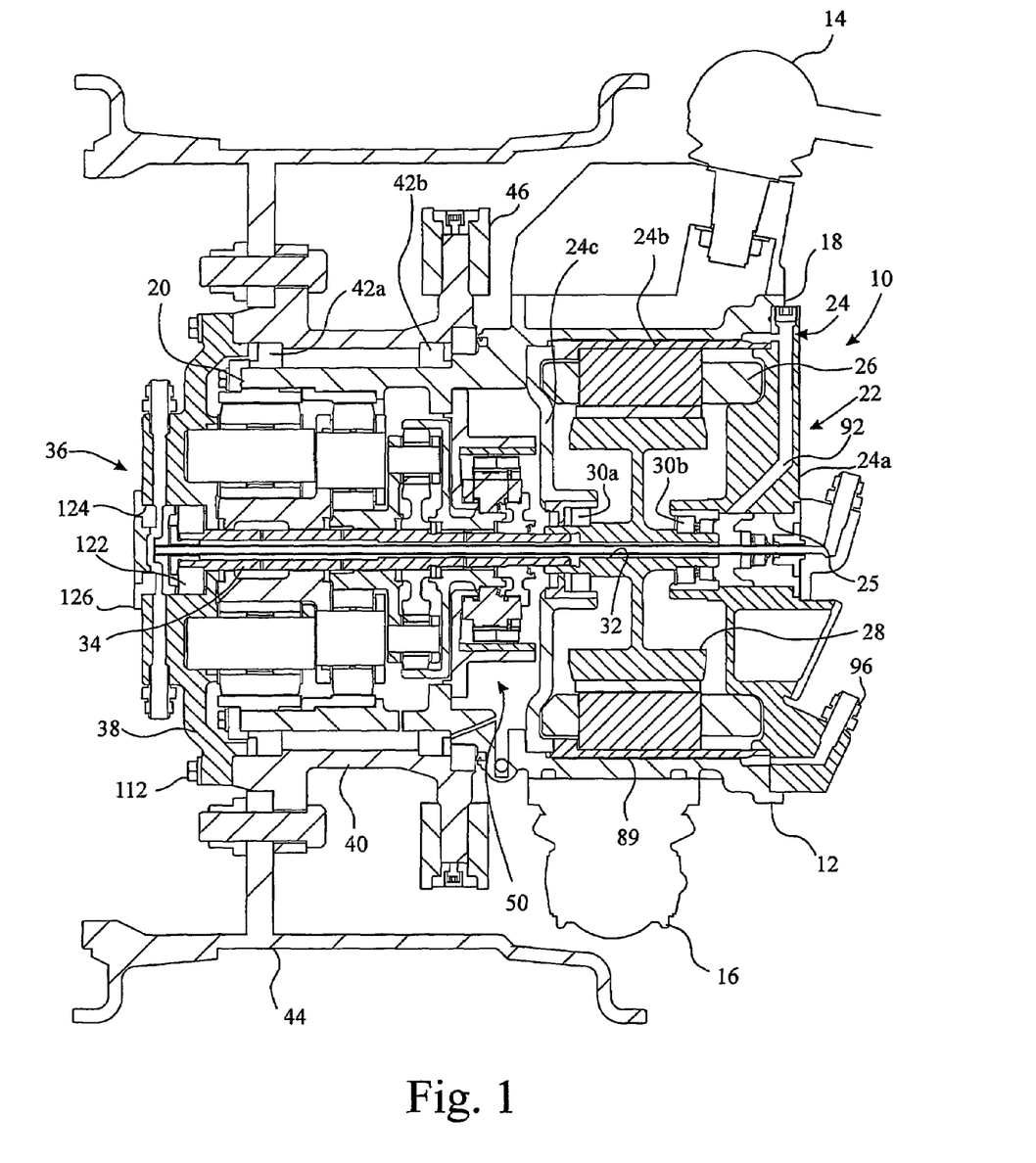
FIG. 1 is a side section showing the general assembly of a hub drive in accordance with the present invention.

As can be seen most clearly from FIG. 1, the arrangement of the present invention permits the motor 22 to be withdrawn from the inboard end of the housing 12 while the wheel 44 of the vehicle is on the ground. There is no necessity, assuming sufficient room is provided between the rear of the housing 12 and the vehicle body (not shown) to separately support the vehicle and remove the wheel 44. The same is true of the gear box 36, which can be accessed by removing the bolts 112 and removing the drive flange 38 and primary shaft 35 and the planet carrier 76 and 72 retained thereon, along with sun ring 34 and planet ring 58. Gear change mechanism 50 is, however, left in position and must be dismantled from the motor, inboard end of the housing 12. Nevertheless, the entire drive system can be disassembled and serviced without the necessity to remove a wheel. This renders maintenance of the wheel drive very straightforward. By providing a gear change mechanism, so that the drive ratio between the motor rotor 28 and drive flange 38 can be changed, the size of the motor can be considerably reduced, whilst still meeting the dual requirements of high low-speed torque and high cruising speed.

Given that a control system is necessary to drive the motor 22 at an appropriate speed in synchronisation with the drive of other motors on the vehicle, it is straightforward to provide electrical actuation of the gear change mechanism, as described above. Indeed, one of the advantages of a gear change mechanism is the provision of a neutral position, so that drive to the gearbox from the motor can be disconnected when desired, or vice-versa. The ability to select neutral may be important in a fault condition when, for example, the motor or wheel speed cannot be detected. In this event, drive to a given wheel can be terminated and that drive put in neutral to minimise the effect of the fault. Moreover, since wheel speed and motor speed are monitored by the control system (primarily for the purposes of synchronisation with other wheels) it is also straightforward to change the speed of the motor when the gear change mechanism 50 is in neutral. This enables the motor speed to be synchronised with the new gear to be entered. In this way, mechanical synchronisation elements can be avoided.

A further possible feature is acceleration or deceleration of the motor in the instant before a particular gear is disengaged so as to remove torque from the gear change mechanism 50 when a gear is being disengaged.

Another feature of the hub drive is the external mechanical brake disc (46). Although regenerative braking can be employed through the motor acting as a generator during braking (so as to save energy, as well as assisting braking of the vehicle), the provision of a mechanical brake primarily permits a small motor to be employed.

Accordingly, the entire drive has relatively small dimensions, particularly in the axial direction, so that there is less cantilever between suspension elements and the wheel load, despite the necessity to provide sufficient room between the inboard end of the drive housing and vehicle body parts to permit removal of the motor.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A hub drive system for a vehicle, comprising:
   a) a tubular housing suspended by the vehicle and having an inboard and an outboard end;
   b) a wheel hub rotationally mounted on the outboard end of the housing;
   c) an electric motor disposed in the inboard end of the housing;
   d) a planetary gearbox, disposed in the outboard end of the housing and driven by the motor through a hollow primary shaft;
   e) an output flange of the gearbox operatively connected to the hub;
   f) a casing for the motor;
   g) a stator in the casing;
   h) a hollow rotor rotationally mounted in the casing and operatively connected to the primary shaft of the gearbox;
   i) a gallery defined between the housing and casing and into which a lubricant for the gearbox is injectable under pressure to cool the motor;
   j) a passage in the casing to deliver lubricant still under pressure from said gallery to said hollow rotor to further cool the motor; and
   k) said rotor being arranged to deliver said lubricant still under pressure to the primary shaft to lubricate the gearbox, wherein a space between the rotor and stator is free of said lubricant.

2. A drive system as claimed in claim 1, in which the motor casing has a substantially cylindrical outboard end sealed and centred in the housing by an O-ring.

3. A drive system as claimed in claim 1, in which the casing is a sliding fit in the housing to permit inboard access to the motor without any need for a wheel removal.

4. A hub drive system for a vehicle, comprising:
   a) a tubular housing suspended by the vehicle and having inboard and outboard open ends;
   b) a wheel hub rotationally mounted through hub bearings on the outboard end of the housing;
   c) an electric motor disposed in the inboard end of the housing;
   d) a planetary gearbox, disposed in the outboard end of the housing within the radial confines of said bearings and driven by the motor through a primary shaft;
   e) an output flange of the gearbox detachably connected to the hub and closing the outboard end of the housing; wherein
   f) without removing the wheel, the motor is removable inboard of the housing and the gearbox is dismantleable primarily outboard of the housing.

5. A drive system as claimed in claim 4, in which the primary shaft of the gearbox is rotationally supported in the hub by a bearing disposed on the primary shaft and in a drive flange bolted to the hub.

6. A drive system as claimed in claim 5, in which the other, inboard end of the primary shaft is journalled in the motor.

7. A drive system as claimed in claim 4, in which the motor has a casing, a stator fixed in the casing and a rotor rotationally journalled in the casing.

8. A drive system as claimed in claim 5, in which the primary shaft is journalled in the motor by being rotationally journalled in a rotor.

9. A drive system as claimed in claim 4, in which the gearbox comprises two stages of gear reduction and a gear change mechanism.

10. A drive system as claimed in claim 9, in which the gear change mechanism comprises a shift ring for an intermediate planet gear ring rotationally mounted on the primary shaft and driving the hub, which shift ring is lockable to one of the primary shaft and the housing by a shift element.

11. A drive system as claimed in claim 10, in which the planet gear ring drives the hub through one or two fixed ratio gear sets.

12. A drive system as claimed in claim 10, in which the shift mechanism comprises a shift element slidable between two positions, in a first position locking the shift ring to a housing gear ring, and in a second position locking the shift gear ring to a primary shaft ring.

13. A drive system as claimed in claim 12, in which the shift element includes a ferromagnetic disc axially shiftable by solenoids mounted in the housing.

14. A drive system as claimed in claim 12, in which the shift element comprises a magnetic sleeve shiftable by an induction coil mounted in the housing.

15. A drive system as claimed in claim 9, in which the gear change mechanism farther includes active speed control of the motor during gear change to adjust dynamically the motor speed to the requisite speed commensurate with the desired gear ratio.

16. A drive system as claimed in claim 15, in which said shift element is in a neutral position intermediate said first and second positions in which neither said housing gear ring nor said primary shaft gear ring is locked to the shift ring.

17. A drive system as claimed in claim 16, in which said active speed control comprises a motor speed sensor, a hub speed sensor and a control arrangement to accelerate or decelerate the motor in dependence upon which gear is selected.

18. A drive system as claimed in claim 17, in which said active speed control is in software.

19. A drive system as claimed in claim 1, in which a brake disc is mounted on the hub and brake callipers are mounted on the housing.

20. A drive system as claimed in claim 4, in which a brake disc is mounted on the hub and brake callipers are mounted on the housing.

21. A hub drive system for a vehicle, comprising:
   a) a tubular housing suspended by the vehicle and having inboard and outboard open ends;
   b) a wheel hub rotationally mounted through hub bearings on the outboard end of the housing;
   c) an electric motor disposed in the inboard end of the housing and comprising a stator fixed with respect the housing and a rotor journalled for rotation in the housing;
   d) a planetary gearbox, disposed in the outboard end of the housing and driven by the motor through a primary shaft coaxial with the rotor;
   e) an output flange of the gearbox detachably connected to the hub and closing the outboard end of the housing; and
   f) a gear change mechanism between the rotor and a first stage gear reduction of the gearbox to provide three options:
      i) to interpose a further gear reduction stage ahead of said first stage reduction;
      ii) to disconnect drive of the motor from the gearbox; and to isolate said further gear reduction stage and connect drive from the motor direct to said first stage.
      iii) To isolate said farther gear reduction stage and connect drive from the motor direct to said first stage.

22. A drive system as claimed in claim 21, in which the gear change mechanism comprises a shift element to effect gear change.

23. A drive system as claimed in claim 22, in which:
   an intermediate planet ring is journalled for rotation on the primary shaft and has a shift ring fixed thereon;
   said shift element is movable between two positions, in a first of which it locks the shift ring to a primary shaft ring, locked on the primary shaft, and in a second of which it locks the shift ring to a housing ring, locked with respect to the housing;
   an intermediate sun gear, fixed on the primary shaft, transmits drive through planets mounted on an intermediate planet carrier;
   said drive is without speed reduction when the shift ring is in said first position and said intermediate planet ring rotates at primary shaft speed, and, when the shift ring is in said second position, said drive is with speed reduction via said planets rolling between said intermediate sun gear and intermediate planet ring; and
   said intermediate sun gear, intermediate planet ring and planets constitute said further gear reduction stage.

24. A drive system as claimed in claim 23, in which said shift element has a third, neutral position in which the shift ring is locked to neither the primary shaft ring nor the housing ring.

25. A drive system as claimed in claim 24, in which said neutral position is between said first and second positions, said shift element moving coaxially with respect to said primary shaft.

26. A drive system as claimed in claim 22, in which said shift element is a ring surrounding said primary shaft, is provided with ferromagnetic elements and is disposed within the confines of a gear shift coil fixed in the housing and adapted to move the shift element by magnetic interaction.

27. A drive system as claimed in claim 21, in which said first stage gear reduction comprises a first sun gear, driven by the motor, planets, carried by a first planet carrier and driving said output flange, and a first planet ring fixed in the housing.

28. A drive system as claimed in claim 27, in which said first sun ring is formed on said intermediate planet carrier.

29. A drive system as claimed in claim 21, in which the gearbox has a second stage reduction after said first stage and directly driving said output flange.

30. A drive system as claimed in claim 29, in which said second stage comprises a second sun gear, driven by the first stage gear reduction, planets, carried by said output flange, and a second planet ring fixed in the housing.

31. A drive system as claimed in claim 27, in which said second stage comprises a second sun gear, driven by the first stage gear reduction, planets, carried by said output flange, and a second planet ring fixed in the housing, and in which said second sun ring is formed on said first planet carrier.

32. A drive system as claimed in claim 1, in which an air tube is disposed in the rotor and primary shaft to deliver air from a port in the casing to a port in the hub for controlling tyre pressure of a wheel mounted on the hub.

33. A drive system as claimed in claim 32, in which the air tube is arranged to increase the rotor contact surface area per unit volume of lubricant flowing past the rotor at any given instant.

34. A drive system as claimed in claim 32, in which said air tube is fixed in the output flange, passages therein communicating with a port on the output flange to permit connection of a conduit to a tyre valve of a wheel mounted on the hub.

35. A drive system as claimed in claim 34, in which said air tube is rotationally mounted in an inboard end plate of the motor, passages therein communicating with a port on the end plate to permit connection of a conduit from a source of air under sufficient pressure to control inflation of the tyre, a rotary seal being disposed between said air tube and end plate.

36. A drive system as claimed in claim 35, in which said seal separates said passages in the endplate that communicate the air tube with said port on the end plate from said passage in the casing that delivers lubricant from said gallery to said hollow rotor.

37. A drive system as claimed in claim 4, in which an air tube is disposed in the rotor and primary shaft to deliver air from a port in the casing to a port in the hub for controlling tyre pressure of a wheel mounted on the hub.

38. A drive system as claimed in claim 37, in which said air tube is fixed in the output flange, passages therein communicating with a port on the output flange to permit connection of a conduit to a tyre valve of a wheel mounted on the hub.

39. A drive system as claimed in claim 38, in which said air tube is rotationally mounted in an inboard end plate of the motor, passages therein communicating with a port on the end plate to permit connection of a conduit from a source of air under sufficient pressure to control inflation of the tyre, a rotary seal being disposed between said air tube and end plate.

40. A drive system as claimed in claim 21, in which an air tube is disposed in the rotor and primary shaft to deliver air from a port in the casing to a port in the hub for controlling tyre pressure of a wheel mounted on the hub.

41. A drive system as claimed in claim 40, in which said air tube is fixed in the output flange, passages therein communicating with a port on the output flange to permit connection of a conduit to a tyre valve of a wheel mounted on the hub.

42. A drive system as claimed in claim 41, in which said air tube is rotationally mounted in an inboard end plate of the motor, passages therein communicating with a port on the end plate to permit connection of a conduit from a source of air under sufficient pressure to control inflation of the tyre, a rotary seal being disposed between said air tube and end plate.

43. A hub drive system for a vehicle, comprising:
a) a tubular housing suspended by the vehicle and having inboard and outboard open ends;
b) a wheel hub rotationally mounted through hub bearings on the outboard end of the housing;
c) an electric motor disposed in the inboard end of housing;
d) a planetary gearbox, disposed in the outboard end of the housing within the radial confines of said bearings and driven by the motor through a hollow primary shaft;
e) an output flange of the gearbox operatively connected to the hub and closing the outboard end of the housing,
f) a casing for the motor;
g) a stator in the casing;
h) a hollow rotor rotationally mounted in the casing and operatively connected to the primary shaft of the gearbox;
i) a gallery defined between the housing and casing and into which a lubricant for the gearbox is injectable to cool the motor;
j) a passage in the casing to deliver lubricant from said gallery to said hollow rotor to further cool the motor; and
k) said rotor being arranged to deliver said lubricant to the primary shaft to lubricate the gearbox; wherein
l) without removing the wheel, the motor is removable inboard of the housing and the gearbox is dismantleable primarily outboard of the housing.

44. A drive system as claimed in claim 43, further comprising:
m) a gear change mechanism between the rotor and a first stage gear reduction of the gearbox to provide three options:
i) to interpose a further gear reduction stage ahead of said first stage reduction;
ii) to disconnect drive of the motor from the gearbox; and
iii) to isolate said further gear reduction stage and connect drive from the motor direct to said first stage.

45. A hub drive system for a vehicle, comprising:
a) a tubular housing suspended by the vehicle and having an inboard and an outboard end;
b) a wheel hub rotationally mounted on the outboard end of the housing;
c) an electric motor disposed in the inboard end of housing;
d) a planetary gearbox, disposed in the outboard end of the housing and driven by the motor through a hollow primary shaft;
e) an output flange of the gearbox operatively connected to the hub,
f) a casing for the motor;
g) a stator in the casing;
h) a hollow rotor rotationally mounted in the casing and operatively connected to the primary shaft of the gearbox;
i) a gallery defined between the housing and casing and into which a lubricant for the gearbox is injectable to cool the motor;
j) a passage in the casing to deliver lubricant from said gallery to said hollow rotor to further cool the motor;
k) said rotor being arranged to deliver said oil to the primary shaft to lubricate the gearbox; and
l) a gear change mechanism between the rotor and a first stage gear reduction of the gearbox to provide three options:
i) to interpose a further gear reduction stage ahead of said first stage reduction;
ii) to disconnect drive of the motor from the gearbox; and
iii) to isolate said further gear reduction stage and connect drive from the motor direct to said first stage.

46. A drive system as claimed in claim 45, wherein:
m) the inboard and outboard housing ends are open;
n) the hub is rotationally mounted through hub bearings on the outboard end of the housing;
o) the gearbox is disposed within the radial confines of said bearings;
p) the output flange of the gearbox closes the outboard end of the housing; and
q) without removing the wheel, the motor is removable inboard of the housing and the gearbox is dismantleable primarily outboard of the housing.

47. A hub drive system for a vehicle, comprising:
a) a tubular housing suspended by the vehicle and having inboard and outboard open ends;
b) a wheel hub rotationally mounted through hub bearings on the outboard end of the housing;
c) an electric motor disposed in the inboard end of the housing and comprising a stator fixed with respect the housing and a rotor journalled for rotation in the housing;
d) a planetary gearbox, disposed in the outboard end of the housing within the radial confines of said bearings and driven by the motor through a primary shaft coaxial with the rotor;
e) an output flange of the gearbox detachably connected to the hub and closing the outboard end of the housing; wherein f) without removing the wheel, the motor is removable inboard of the housing and the gearbox is dismantleable primarily outboard of the housing; and g) a gear change mechanism between the rotor and a first stage gear reduction of the gearbox to provide three options:
  i) to interpose a further gear reduction stage ahead of said first stage reduction;
  ii) to disconnect drive of the motor from the gearbox; and
  iii) to isolate said further gear reduction stage and connect drive from the motor direct to said first stage.

48. A vehicle incorporating a hub drive system as claimed in claim 1.

49. A vehicle incorporating a hub drive system as claimed in claim 4.

50. A vehicle incorporating a hub drive system as claimed in claim 21.

51. A vehicle incorporating a hub drive system as claimed in claim 43.

52. A vehicle incorporating a hub drive system as claimed in claim 45.

53. A vehicle incorporating a hub drive system as claimed in claim 47.

* * * * *

UNITED STATES PATENT AND TRADEMARK OFFICE
CERTIFICATE OF CORRECTION

| | |
|---|---|
| PATENT NO. | : 7,527,113 B2 |
| APPLICATION NO. | : 10/518881 |
| DATED | : May 5, 2009 |
| INVENTOR(S) | : Jenkins |

It is certified that error appears in the above-identified patent and that said Letters Patent is hereby corrected as shown below:

Column 9,

Lines 21 and 63, "farther" should read --further--.

Signed and Sealed this

Fourth Day of August, 2009

JOHN DOLL
*Acting Director of the United States Patent and Trademark Office*